United States Patent Office 3,825,571
Patented July 23, 1974

3,825,571
MYCOPHENOLIC ACID DERIVATIVES
Takasi Mori, Tokyo, Sakae Takaku, Ageo, Seikichi Suzuki, Tokyo, and Minoru Tsuda, Shiki, Japan, assignors to Chugai Seiyaku Kabushiki Kaisha, Tokyo, Japan
No Drawing. Filed July 28, 1972, Ser. No. 275,901
Claims priority, application Japan, July 31, 1971, 46/57,141, 46/57,142
Int. Cl. C07d 5/34
U.S. Cl. 260—343.3    6 Claims

ABSTRACT OF THE DISCLOSURE

Mycophenolic acid derivatives represented by the formula

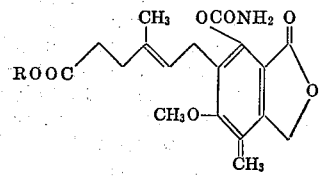

wherein R is lower alkyl or lower alkenyl, which are useful as an anti-cancer or anti-tumor agent and a process for the production thereof are disclosed.

BACKGROUND OF THE INVENTION (1) Field of the Invention

This invention relates to mycophenolic acid derivatives and the process for the production thereof. More particularly, the present invention relates to the mycophenolic acid derivatives represented by the formula

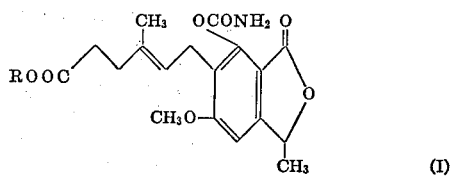

wherein R represents a lower alkyl group or a lower alkenyl group.

(2) Description of the Prior Art

Mycophenolic acid is an antibiotic found in the fermentation broth of Penicillium brevi-compactum and is known to have a weak growth inhibitory activity against Gram-positive microorganisms, fungi and yeasts. Recently, attention has been drawn to the anti-cancer activity of mycophenolic acid in view of the fact that mycophenolic acid is found to have a potent inhibitory activity on the implanted tumor in a wide variety of animal species. However, the therapeutic index of mycophenolic acid is not to be satisfactory.

SUMMARY OF THE INVENTION

The present inventors conducted an extensive investigation on the above matters and as a result succeeded in synthesis of novel mycophenolic derivatives having an excellent anti-cancer activity.

An object of this invention is therefore to provide mycophenolic acid derivatives represented by the above formula (I) which are useful as an anti-cancer or anti-tumor agent.

Another object of this invention is to provide processes for the production of mycophenolic acid derivatives represented by the formula (I).

These and other objects of this invention will be apparent by those skilled in the art by referring to the description given hereinafter.

DETAILED DESCRIPTION OF THE INVENTION

In accordance with the process of this invention, the mycophenolic acid derivatives represented by the above formula (I) can be prepared by reacting a compound represented by the formula

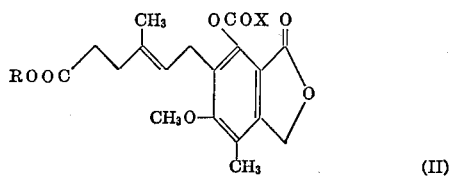

wherein R is as defined above and X represents a halogen atom, with ammonia.

The compound represented by the formula (II) above used as a starting material of the process of this invention can be prepared from mycophenolic acid by the conventional esterification followed by the reaction with phosgene or the like.

In the process of this invention, the reaction between the compound (II) and ammonia can be carried out in the presence or absence of a reaction solvent. The reaction solvent which can preferably be used in the present invention includes an organic inert solvent such as benzene, diethyl ether, tetrahydrofuran, dioxane, chloroform, methylene chloride, ethyl acetate, carbon tetrachloride or the like. The reaction temperature is not critical and is preferably in the range of from $-10°$ to $50°$ C., more preferably in the range of $0°$ to $30°$ C. for a period of from 1 to 5 hours. The process of this invention is a reaction which releases an acid of the formula HX, and, therefore, the reaction between the compound (II) and ammonia is preferably carried out in the presence of a tertiary amine such as triethylamine, pyridine, N,N-dimethylaniline, N-methylpyrrolidine, N-methylpiperidine or the like or an inorganic base such as sodium carbonate, potassium carbonate or the like. Alternatively, the reaction may be conducted by using more than two molar equivalents of ammonia per one molar equivalent of the compound (II) instead of using the above tertiary amine or inorganic base.

The desired compounds represented by the formula (I) can also be prepared by reacting a mycophenolic acid ester represented by the formula

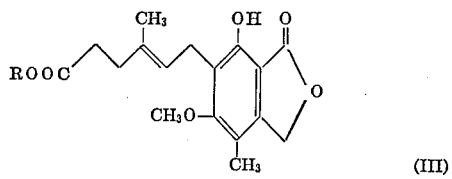

wherein R is as defined above, with a metal salt of cyanic acid. This reaction can advantageously be conducted in an organic solvent such as chloroform, tetrahydrofuran, benzene, dichloromethane, acetic acid, carbon tetrachloride, diethyl ether, ethyl acetate, dioxane or the like and, preferably in the presence of an acidic reagent such as hydrochloric acid, sulfuric acid, trichloroacetic acid, trifluoroacetic acid or the like. The metal salt of cyanic acid includes an alkali metal salt, for example, a sodium or potassium salt. The temperature which can be used in the reaction between the mycophenolic acid ester (III) and the metal salt of cyanic acid is not critical but is generally in the range of from $0°$ C. to $60°$ C., preferably 20 to $60°$ C. This reaction can advantageously be carried out using an excess amount of the metal salt of cyanic acid and is usually completed within a period of about 5 to 20 hours.

In each of the reactions for producing the mycophenolic acid derivatives (I), the desired compound (I) can be isolated from the reaction mixture by any one of the conventional procedures, for example, by filtration of the reaction mixture followed by concentration of the filtrate or by extraction of the reaction mixture with an organic solvent followed by concentration of the extract. The thus obtained product can then be purified by the conventional procedure such as recrystallization from an appropriate solvent or a solvent system.

The present invention is further illustrated by the following Experiments and Examples, but they are given for the illustrative purpose only and not to be construed as limiting the scope of this invention.

EXPERIMENT 1

Activity on L–1210 Leukemia Tumor $BDF_1$ mice (body weight, 20 g. ±2 g.) were intraperitoneally implanted with $1 \times 10^6$ cells/mouse of L–1210 luekemia tumor cells, and, after 20 hours following the implantation, each of the test compounds was intraperitoneally administered to the mice at the dose of 150 mg./kg. once a day over a period of five days. The survival period (days) of the test mice was determined, and the activity of the test compounds was evaluated in terms of $T/C$ (an average survival day of the treated mice/an average survival day of the control mice).

Activity on Hypodermically Implanted Ehrlich Tumor 4 cs. mice (male; body weight, 20 g. ±2 g.) were hypodermically implanted with $5 \times 10^6$ cells/mouse of Ehrlich ascites-tumor cells, and, after 20 hours following the inoculation, each of the test compounds was intraperitoneally administered to the mice at the dose of 150 mg./kg. once a day over a period of five days. The tumor weight of the sacrificed mice was determined after 10 days of the implantation, and the activity of the test compounds was evaluated in terms of $T/C$ (an average tumor weight of the treated mice/an average tumor weight of the control mice).

In the above tests, the test compounds were used as a solution dissolved in distilled water or as a suspension in distilled water containing 0.5% CMC.

The results obtained in the above experiments are shown in Table 1 below.

TABLE 1.—ANTITUMOR ACTIVITY OF MYCOPHENOLIC ACID DERIVATIVES

| Compound | Activity* | |
| --- | --- | --- |
| | T/C in L–1210 | T/C in Ehrlich tumor |
| Example: | | |
| 1 | + + + + | + + + |
| 2 | + + + + | + + + + |
| 3 | + + + | + + + |
| 4 | + + + | + + + |
| 5 | + + + | + + + |
| Mycophenolic acid | + | + |

*See the following table:

| | T/C in L–1210 | T/C/in Ehrlich tumor |
| --- | --- | --- |
| + + + + | Higher than 1.5 | Lower than 0.1. |
| + + + | 1.4–1.5 | 0.1–0.2. |
| + + | 1.3–1.4 | 0.2–0.3. |
| + | 1.2–1.3 | 0.3–0.4. |

It is apparent from the above results that the compounds of this invention exhibit an antitumor activity on L–1210 leukemia tumor superior to that of mycophenolic acid. It is also noted that most of the compounds exhibits an activity on the hypodermically implanted Ehrlich tumor cells superior to mycophenolic acid.

EXPERIMENT 2

From the results on the dose response experiments on L–1210 leukemia tumor as described above with respect to the compounds prepared in Examples 1 and 2, the percent prolongation of the maximum survival days (Max. ILS), the dose at which survival days are prolonged to the maximum (Optimal Dose) and the dose at which survival days are prolonged by 30% ($ILS_{30}$) were determined. The results obtained are shown in Table 2 below.

TABLE 2

| Compound | Route of administration | Max. ILS (T/C) | Optimal dose (mg./kg.) | $ILS_{30}$ (mg./kg.) | Therapeutic index |
| --- | --- | --- | --- | --- | --- |
| Example 1 | I.p. | 1.65 | 300 | 38 | 7.9 |
| | P.o. | 1.63 | 900 | 340 | 2.6 |
| Example 2 | I.p. | 1.72 | 150 | 18 | 3.1 |
| | P.o. | 1.64 | 500 | 160 | 3.1 |
| Mitomycin C | I.p. | 1.77 | 2.0 | 0.62 | 3.2 |

The results shown in Table 2 above indicate that the compounds of this invention exhibit the therapeutic index about 3 times higher than that of Mitomycin C in the intraperitoneal administration, and that these compounds are highly active in the oral administration.

In summary, it is concluded from the overall results of the experiments that the compounds of this invention are of value because of their high therapeutical effects on the L–1210 leukemia tumor and the hypodermically implanted Ehrlich tumor.

EXAMPLE 1

Methyl 5-(4'-Carbamoyloxy-6' - Methoxy-7'-Methyl-3'-Oxo-5'-Phthalanyl)-3-Methyl-3-Pentene-1-Carboxylate (A) About 100 g. of phosgene was bubbled into 200 ml. of dried benzene, and to the resulting solution was added dropwise a solution of 33.4 g. of methyl mycophenolate and 7.91 g. of pyridine in 100 ml. of benzene over two hours while stirring at a temperature of from 0° C. to 5° C. After stirring at room temperature for an additional 10 hours, the mixture was filtered to remove pyridine hydrochloride, and the filtrate was concentrated to obtain about 40 g. of a crude product of methyl 5-(4'-chloroformyloxy-6' - methoxy-7'-methyl-3'-oxo-5'-phthalanyl)-3 - methyl-3-pentene - 1-carboxylate. The thus obtained crude product was a slightly yellow-colored powdery solid and recrystallization of the crude product from ether yielded a pure product having a melting point of from 80.5 to 81.5° C.

(B) About 40 g. of the crude product obtained above was dissolved in 200 ml. of tetrahydrofuran, and, while stirring at 0 to 5° C., to the solution was added dropwise 400 ml. of a solution of ammonia in tetrahydrofuran (0.5 M/l.) over a period of from 0.5 to 1 hour at such a rate that the reaction temperature does not exceed 5° C., followed by stirring for an additional 30 minutes. The reaction mixture was then concentrated under reduced pressure, and the residue was extracted with chloroform. The organic layer was dried and concentrated to obtain a powdery solid which was then recrystallized from benzene to give 23 g. of methyl 5-(4'-carbamoyloxy-6'-methoxy-7'-methyl - 3' - oxo-5'-phthalanyl)-3-methyl-3-pentene-1-carboxylate having a melting point of 147° C.

Analysis: C, 60.72; H, 6.16; N, 3.83.

EXAMPLE 2

Ethyl 5-(4'-Carbamoyloxy-6' - Methoxy-7' - Methyl-3'-Oxo-5'-Phthalanyl)-3-Methyl-3-Pentene-1-Carboxylate (A) In the same manner as described in Example 1, Part (A), ethyl mycophenolate was reacted with phosgene to obtain ethyl 5-(4'-chloroformyloxy-6'-methoxy-7'-methyl-3'-oxo-5'-phthalanyl)-3-methyl-3 - pentene-1-carboxylate having a melting point of 79.5°–80.5° C.

(B) In the same manner as described in Example 1, Part (B), ethyl 5-(4'-chloroformyloxy-6'-methoxy-7'-methyl-3'-oxo-5'-phthalanyl)-3-methyl-3 - pentene-1-carboxylate was reacted with ammonia to obtain ethyl 5-(4'-carbamoyloxy - 6'-methoxy - 7'methyl-3' - oxo-5'-phthalanyl)-3-methyl-3-pentene-1-carboxylate having a melting point of 142–143° C.

Analysis: C, 61.28; H, 6.43; N, 3.68.

EXAMPLE 3 n-Butyl 5-(4'-Carbamoyloxy-6' - Methoxy-7'-Methyl-3'-Oxo-5'-Phthalanyl)-3-Methyl-3-Pentene-1-Carboxylate (A) In the same manner as described in Example 1, Part (A), n-butyl mycophenolate was reacted with phosgene to obtain n-butyl 5-(4'-chloroformyloxy-6'-methoxy-7'-methyl-3'-oxo-5'-phthalanyl)-3-methyl - 3-pentene-1-carboxylate, which was not easily crystallized and used directly in the next reaction.

(B) In the same manner as described in Example 1, Part (B), n-butyl 5-(4'-chloroformyloxy-6'-methoxy-7'-methyl-3'-oxo-5'-phthalanyl)-3-methyl-3 - pentene-1-carboxylate was reacted with ammonia to obtain n-butyl 5-(4'-carbamoyloxy - 6'-methoxy-7' - methyl - 3'-oxo-5'-phthalanyl)-3-methyl-3-pentene-1-carboxylate having a melting point of 135.5°–136.5° C.

Analysis: C, 62.96; H, 6.84; N, 3.49.

EXAMPLE 4

Allyl 5-(4'-Carbamoyloxy-6'-Methoxy-7'-Methyl-3'-Oxo-5'-Phthalanyl)-3-Methyl-3-Pentene-1-Carboxylate A solution of 10.8 g. of allyl mycophenolate and 2.37 g. of pyridine in 20 ml. of benzene was added dropwise to 80 ml. of a 50% solution of phosgene in benzene over 1 hour while stirring at a temperature of from −5° C. to 0° C. After stirring overnight at room temperature, the insoluble material was filtered off, and the filtrate was concentrated. The resulting residue was dissolved in 30 ml. of tetrahydrofuran, and to the solution was added 2.9 g. of 28% aqueous ammonia, all at once, at a temperature of 0° C. while stirring. After stirring for an additional 10 minutes, water was added to the reaction mixture which was then extracted with ethyl acetate. The extract was washed with water, dried and concentrated under reduced pressure. The resulting residue was recrystallized from benzene to give 4.2–5.8 g. of allyl 5-(4'-carbamoyloxy-6'-methoxy-7'-methyl - 3' - oxo-5'-phthalanyl)-3-methyl-3-pentene-1-carboxylate having a melting point of 122°–123° C.

Analysis: C, 62.61; H, 6.39; N, 3.40.

EXAMPLE 5 iso-Propyl 5-(4'-Carbamoyloxy-6'-Methoxy-7'-Methyl-3'-Oxo-5'-Phthalanyl)-3-Methyl-3-Pentene-1-Carboxylate In the same manner as described in Example 4, iso-propyl mycophenolate was reacted with phosgene followed by with ammonia to give iso-propyl 5-(4'-carbamoyloxy-6'-methoxy-7'-methyl - 3' - oxo-5'-phthalanyl)-3-methyl-3-pentene-1-carboxylate having a melting point of 147°–148° C.

Analysis: C, 62.39; H, 6.80; N, 3.41

EXAMPLE 6

Methyl 5-(4'-Carbamoyloxy-6'-Methoxy-7'-Methyl-3'-Oxo-5'-Phthalanyl)-3-Methyl-3-Pentene-1-Carboxylate 30 g. of sodium cyanate in a powder form was added over one hour in a small portion to a mixture of 33.4 g. of methyl mycophenolate and 30 ml. of trifluoroacetic acid, followed by stirring for 15 hours. 500 ml. of water was then added to the reaction mixture which was then extracted twice with chloroform. The organic layer was washed successively with water, an aqueous sodium bicarbonate and water, dried over sodium sulfate and concentrated. The resulting residual solid was washed twice with cold benzene, and the insoluble material was recrystallized from benzene to give 8 g. of the desired methyl 5-(4'-carbamoyloxy - 6' - methoxy-7'-methyl - 3' - oxo-5'-phthalanyl)-3-methyl-3-pentene - 1 - carboxylate having a melting point of 147° C.

Analysis: C, 60.72; H, 6.16; N, 3.83

EXAMPLE 7

Ethyl 5-(4'-Carbamoyloxy-6'-Methoxy-7'-Methyl-3'-Oxo-5'-Phthalanyl)-3-Methyl-3-Pentene-1-Carboxylate 34.8 g. of ethyl mycophenolate was treated in the same manner as described in Example 6 to give 9.1 g. of ethyl 5-(4'-carbamoyloxy - 6' - methoxy-7'-methyl-3'-oxo-5'-phthalanyl)-3-methyl-3-pentene - 1 - carboxylate having a melting point of 142°–143° C.

Analysis: C, 61.28; H, 6.43; N, 3.68

EXAMPLE 8 n-Butyl 5-(4'-Carbamoyloxy-6'-Methoxy-7'-Methyl-3'-Oxo-5'-Phthalanyl)-3-Methyl-3-Pentene-1-Carboxylate 47.6 g. of n-butyl mycophenolate was treated in the same manner as described in Example 6, and the reaction mixture was extracted. The organic extract was concentrated and the resulting semi-solid was washed twice with a solvent system of benzene-hexane (5:2). Recrystallization of the insoluble material from benzene yielded 6 g. of n-butyl 5-(4'-carbamoyloxy - 6' - methoxy-7'-methyl-3'-oxo-5'-phthalanyl)-3-methyl - 3 - pentene-1-carboxylate having a melting point of 135.5°–136.5° C.

Analysis: C, 62.96; H, 6.84; N, 3.49

While the invention has been described in detail and with reference to specific embodiments thereof, it will be apparent that various changes and modifications can be made therein without departing from the spirit and scope thereof.

What is claimed is:

1. A mycophenolic acid derivative of the formula

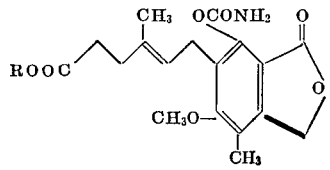

wherein R represents lower alkyl or lower alkenyl.

2. Methyl 5-(4'-carbamoyloxy - 6' - methoxy-7'-methyl-3'-oxo - 5' - phthalanyl)-3-methyl-3-pentene-1-carboxylate in accordance with Claim 1.

3. Ethyl 5-(4'-carbamoyloxy - 6' - methoxy-7'-methyl-3'-oxo - 5' - phthalanyl)-3-methyl-3-pentene-1-carboxylate in accordance with Claim 1.

4. n-Butyl 5-(4'-carbamoyloxy - 6' - methoxy-7'-methyl-3'-oxo - 5' - phthalanyl)-3-methyl-3-pentene-1-carboxylate in accordance with Claim 1.

5. Allyl 5-(4'-carbamoyloxy - 6' - methoxy-7'-methyl-3'-oxo-5'-phthalanyl) - 3 - methyl-3-pentene-1-carboxylate in accordance with Claim 1.

6. iso-Propyl 5-(4'-carbamoyloxy - 6' - methoxy-7'-methyl-3'-oxo-5'-phthalanyl) - 3 - methyl - 3 - pentene-1-carboxylate in accordance with Claim 1.

References Cited

UNITED STATES PATENTS 3,705,894    12/1972    Gerzon et al. _____ 260—343.3

DONALD G. DAUS, Primary Examiner

A. M. T. TIGHE, Assistant Examiner

U.S. Cl. X.R.

424—279